(12) United States Patent
Inagaki et al.

(10) Patent No.: US 9,373,836 B2
(45) Date of Patent: Jun. 21, 2016

(54) ACTIVE MATERIAL FOR BATTERY, NON-AQUEOUS ELECTROLYTE BATTERY AND BATTERY PACK

(71) Applicant: Kabushiki Kaisha Toshiba, Tokyo (JP)

(72) Inventors: Hiroki Inagaki, Kawasaki (JP); Keigo Hoshina, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/863,405

(22) Filed: Apr. 16, 2013

(65) Prior Publication Data

US 2013/0224531 A1    Aug. 29, 2013

Related U.S. Application Data

(63) Continuation of application No. 12/818,566, filed on Jun. 18, 2010, now abandoned, which is a continuation of application No. PCT/JP2009/053310, filed on Feb. 18, 2009.

(30) Foreign Application Priority Data

Mar. 13, 2008 (JP) .................................. 2008-064241
Jan. 15, 2009 (JP) .................................. 2009-006802

(51) Int. Cl.
*H01M 4/02* (2006.01)
*H01M 4/131* (2010.01)
(Continued)

(52) U.S. Cl.
CPC ............ *H01M 4/131* (2013.01); *H01M 2/1077* (2013.01); *H01M 4/366* (2013.01);
(Continued)

(58) Field of Classification Search
USPC .............................................. 429/7
See application file for complete search history.

(56) References Cited

U.S. PATENT DOCUMENTS 6,063,142 A    5/2000    Kawakami et al.
6,787,232 B1    9/2004    Chiang et al.
(Continued)

FOREIGN PATENT DOCUMENTS

CN    1571197    1/2005
CN    1292505    12/2006
(Continued)

OTHER PUBLICATIONS

Office Action issued Feb. 28, 2012, in Japanese Patent Application 2009-006802, filed Jan. 15, 2009 (with English-language Translation).
(Continued)

*Primary Examiner* — Jacob Marks
(74) *Attorney, Agent, or Firm* — Oblon, McClelland, Maier & Neustadt, L.L.P.

(57) ABSTRACT

According to one embodiment, a non-aqueous electrolyte battery includes an outer package, a positive electrode housed in the outer package, a negative electrode housed with a space from the positive electrode in the outer package and including an active material, and a non-aqueous electrolyte filled in the outer package. The active material includes a lithium-titanium composite oxide particle, and a coating layer formed on at least a part of the surface of the particle and including at least one metal selected from the group consisting of Mg, Ca, Sr, Ba, Zr, Fe, Nb, Co, Ni, Cu and Si, an oxide of at least one metal selected from the group or an alloy containing at least one metal selected from the group.

17 Claims, 5 Drawing Sheets

(51) Int. Cl.
 *H01M 4/36* (2006.01)
 *H01M 4/38* (2006.01)
 *H01M 4/485* (2010.01)
 *H01M 10/48* (2006.01)
 *H01M 2/10* (2006.01)
 *H01M 4/50* (2010.01)
 *H01M 4/58* (2010.01)
 *H01M 10/0525* (2010.01)
 *H01M 10/0569* (2010.01)

(52) U.S. Cl.
 CPC ............... *H01M 4/38* (2013.01); *H01M 4/485* (2013.01); *H01M 10/482* (2013.01); *H01M 2/1061* (2013.01); *H01M 4/502* (2013.01); *H01M 4/58* (2013.01); *H01M 4/5825* (2013.01); *H01M 10/0525* (2013.01); *H01M 10/0569* (2013.01); *H01M 2004/027* (2013.01); *H01M 2200/00* (2013.01); *Y02E 60/122* (2013.01); *Y02P 70/54* (2015.11)

(56) References Cited

U.S. PATENT DOCUMENTS

| | | | | |
|---|---|---|---|---|
| 7,202,000 | B2 * | 4/2007 | Iriyama et al. | 429/231.95 |
| 2002/0076580 | A1 * | 6/2002 | Tudron | 429/1 |
| 2004/0101744 | A1 * | 5/2004 | Suzuki | 429/61 |
| 2004/0131941 | A1 * | 7/2004 | Belharouak et al. | 429/231.95 |
| 2004/0253518 | A1 | 12/2004 | Hosoya et al. | |
| 2006/0115732 | A1 | 6/2006 | Zaghib et al. | |
| 2006/0127773 | A1 | 6/2006 | Kawakami et al. | |
| 2007/0154815 | A1 * | 7/2007 | Kawasaki et al. | 429/340 |
| 2007/0172739 | A1 * | 7/2007 | Visco et al. | 429/322 |
| 2008/0107963 | A1 * | 5/2008 | Lee et al. | 429/174 |
| 2008/0118840 | A1 * | 5/2008 | Yew et al. | 429/231.5 |
| 2008/0152995 | A1 | 6/2008 | Hwang | |
| 2008/0206651 | A1 * | 8/2008 | Kawase et al. | 429/330 |
| 2008/0248385 | A1 * | 10/2008 | Matsumura et al. | 429/209 |
| 2008/0311478 | A1 | 12/2008 | Onuki et al. | |
| 2010/0015509 | A1 | 1/2010 | Inagaki et al. | |

FOREIGN PATENT DOCUMENTS

| | | |
|---|---|---|
| CN | 101188291 | 5/2008 |
| EP | 1 677 375 | 7/2006 |
| JP | 08-022841 | 1/1996 |
| JP | 10-247496 | 9/1998 |
| JP | 2006-107963 | 4/2006 |
| JP | 2006-318797 | 11/2006 |
| JP | 2008-59980 | 3/2008 |
| JP | 2009-152200 | 7/2009 |
| JP | 2009-218198 | 9/2009 |
| KR | 10-2007-0011208 A | 1/2007 |
| WO | WO 2005/076392 * | 8/2005 |

OTHER PUBLICATIONS

Office Action as received in the corresponding Chinese Patent Application No. 200980101636.2 dated Nov. 5, 2012 w/English Translation.

Combined Chinese Office Action and Search Report issued Jul. 3, 2013 in Patent Application No. 200980101636.2 (with English language translation).

Chinese Office Action as received in the corresponding Chinese Patent Application No. 201410320041.9 dated Dec. 15, 2015 w/English Translation Ax Ay.

* cited by examiner

ACTIVE MATERIAL FOR BATTERY, NON-AQUEOUS ELECTROLYTE BATTERY AND BATTERY PACK

CROSS REFERENCE TO RELATED APPLICATIONS

This is a Continuation application of U.S. Ser. No. 12/818,566 filed Jun. 18, 2010, which is a Continuation of Application No. PCT/JP2009/053310, filed Feb. 18, 2009, which was published under PCT Article 21(2) in English; the entire contents of both of which are incorporated herein by reference.

This application is based upon and claims the benefit of priority from Japanese Patent Applications No. 2008-064241, filed Mar. 13, 2008; and No. 2009-006802, filed Jan. 15, 2009; the entire contents of both of which are incorporated herein by reference.

FIELD

Embodiments described herein relate generally to an active material for a battery, a non-aqueous electrolyte battery and a battery pack.

BACKGROUND

Earnest researches and developments have been progressed regarding non-aqueous electrolyte batteries which charge and discharge electricity by transfer of lithium ions from the negative electrode to the positive electrode and vice versa as high-energy density batteries.

These non-aqueous electrolyte batteries are expected to have various characteristics according to their use. They are prospectively used, for example, at a discharge rate of about 3 C for a power source of a digital camera and at a discharge rate of about 10 C or higher for automobiles such as hybrid electric cars. Therefore, the non-aqueous electrolyte batteries used in these fields are desired to have large-current characteristics.

Non-aqueous electrolyte batteries obtained using a lithium-transition metal composite oxide as the positive electrode active material and a carbonaceous material as the negative electrode active material are currently produced on a commercial basis. In these lithium-transition metal composite oxides, Co, Mn and Ni are generally used as the transition metal.

DETAILED DESCRIPTION

In general, according to one embodiment, an active material for a battery includes a lithium-titanium composite oxide particle, and a coating layer formed on at least a part of the surface of the particle and including at least one metal selected from the group consisting of Mg, Ca, Sr, Ba, Zr, Fe, Nb, Co, Ni, Cu and Si, an oxide of at least one metal selected from the group or an alloy containing at least one metal selected from the group. Of the group of metals, at least one metal selected from the group consisting of Mg, Fe, Ni and Co is preferable.

A lithium-titanium composite oxide charges lithium at a potential higher than 1 V (vs. Li/Li$^+$). In the case of an active material (e.g., graphite and a lithium metal) which charges lithium at a potential lower than 1 V (vs. Li/Li$^+$), a thick coating film is formed on its surface by the decomposition of a non-aqueous electrolyte (e.g., a non-aqueous electrolyte solution) in the first charge operation. The formation of the coating film afterward suppresses the decomposition of the non-aqueous electrolyte solution. However, in the case of a lithium-titanium composite oxide which charges lithium at a potential higher than 1 V (vs. Li/Li$^+$), the decomposition reaction of the non-aqueous electrolyte solution is so small that a stable coating film is scarcely formed. As a result, the decomposition reaction of the non-aqueous electrolyte solution afterward proceeds continuously. Such a phenomenon occurs remarkably in the case of active materials, for example, $Li_4Ti_5O_{12}$ having a spinel structure, $Li_2Ti_3O_7$ having a ramsdellite structure, $TiO_2$ having an anatase structure or $TiO_2$ having a rutile structure, which charge lithium at a potential higher than 1 V (vs. Li/Li$^+$).

The active material for a battery according to the embodiment comprises a lithium-titanium composite oxide particle, and a coating layer formed on at least a part of the surface of the particle and including at least one metal selected from the group consisting of Mg, Ca, Sr, Ba, Zr, Fe, Nb, Co, Ni, Cu and Si, an oxide of at least one metal selected from the group or an alloy containing at least one metal selected from the group, it makes possible to efficiently suppress the decomposition of the non-aqueous electrolyte solution on the surface of the lithium-titanium composite oxide particle used as the active material. Therefore, the generation of gas associated with the decomposition of the non-aqueous electrolyte solution can be suppressed.

Such an effect is significantly produced when the active material for a battery is used as the negative electrode material and an active material (e.g., a lithium-manganese composite oxide) containing Mn is used as the positive electrode active material. That is, it is known that when the positive electrode active material containing Mn is used, Mn is eluted in a non-aqueous electrolyte solution. The eluted Mn ions act on the negative electrode to promote the generation of gas. However, if the negative electrode active material according to the embodiment is used, the influence of these Mn ions can be decreased.

The coating layer including metal, metal oxide or alloy forms the above effect solely on a part of the surface of the lithium-titanium composite oxide particle. The metal, metal oxide or alloy is desirably formed on the surface of the lithium-titanium composite oxide particle in an area ratio of 30% or more, more preferably 50% or more and most preferably 100% (entire surface).

Examples of the oxide of a metal include an oxide of at least one metal selected from the group of the above metals. These oxides may contain unavoidable impurities. An oxide of at least one metal selected from the group consisting of Mg, Fe, Ni and Co is preferable.

Examples of the alloy include alloys of two or more metals selected from the above group of metals. These alloys may contain unavoidable impurities. An alloy of two or more metals selected from the group consisting of Mg, Fe, Ni and Co is preferable.

The thickness of the coating layer is preferably 1 to 100 nm. When the coating layer is formed on the entire surface of a lithium-titanium composite oxide particle, the thickness of the coating layer is preferably defined in this range. When the thickness of the coating layer is defined to fall in the range of 1 to 100 nm, the decomposition of the non-aqueous electrolyte solution on the surface of the active material can be efficiently suppressed. Also, the definition of the thickness of the coating layer ensures that the lithium-titanium composite oxide particle can keep the same lithium ion charge/discharge ability as lithium-titanium composite oxide particle on which the coating layer is not formed. Therefore, the active material according to the present invention can exhibit high energy density and large-current characteristics.

The coating layer of the active material can be formed by coating methods such as the CVD method or sputtering method, wet coating methods such as the sol gel method or electroless plating or mixing/milling combined methods such as the ball mill method or jet mill method.

In order to form the coating layer made of the above metal on the surface of the lithium-titanium composite oxide particle, for example, the electroless plating method can be employed. In the forming the coating layer including the above metal, a method is effective following steps: preparing a negative electrode containing the lithium-titanium composite oxide particle and a non-aqueous electrolyte solution which is dissolved a metal ion containing at least one element selected from the above group of elements, and precipitating a metal on the surface of the negative electrode layer by the first charge operation using these negative electrode and non-aqueous electrolyte solution, thereby forming a coating layer made of the metal on the surface of the lithium-titanium composite oxide particle. As such a metal ion source, for example, metal salts such as $Ni(BF_4)_2$, $Co(BF_4)_2$ and $Fe(BF_4)_2$ can be used.

It is preferable to adopt the following methods to form the coating layer made of the above metal oxide on the surface of the lithium-titanium composite oxide particle. The lithium-titanium composite oxide particle is introduced into a solution containing one metal selected from the above group of metals, followed by stirring and drying, and the obtained particle is sintered at 200 to 800° C. for several minutes to several hours to produce an oxide layer of a metal such as Mg or Ca on the surface of the lithium-titanium composite oxide particle, thereby forming the coating layer made of the above metal oxide on the surface of the lithium-titanium composite oxide particle. The above solution may be prepared by dissolving a hydroxide or carbonate containing at least one metal selected from the above metal group in a solvent such as water or ethanol. According to this method, a coating layer made of a metal oxide can be uniformly on the surface of a lithium-titanium composite oxide particle having any form. Also, the above method can improve the adhesion between the coating layer and the lithium-titanium composite oxide particle. Therefore, even if charge-discharge operations are repeated for a long period of time, the effect of limiting the generation of gas along with the decomposition of the non-aqueous electrolyte solution can be produced stably.

In the case of the above negative electrode active material, the peaks derived from Co, Fe, Ni or Mg are detected when the negative electrode active material is subjected to surface-analysis using X-ray photoelectron spectroscopy (XPS). The peak derived from the $2p_{3/2}$ binding energy of Co is detected in the range of 775 to 780 eV, the peak derived from the $2p_{3/2}$ binding energy of Fe is detected in the range of 704 to 709 eV, the peak derived from the $2p_{3/2}$ binding energy of Ni is detected in the range of 850 to 854 eV and the peak derived from the $2p_{3/2}$ binding energy of Mg is detected in the range of 48 to 50 eV. The existence of the peak derived from each element in the above range shows that each element exists in a metal (alloy) state in the coating layer on the surface of the lithium-titanium composite oxide particle.

The amount each of Co, Fe, Ni and Mg detected by XPS component analysis is preferably 0.1 to 1.0 atomic %. If the amount of each element to be detected is less than 0.1 atomic %, there is a fear that the effect of limiting the generation of gas is impaired. If the amount of each element to be detected exceeds 1.0 atomic %, on the other hand, the coating layer itself on the surface of the lithium-titanium composite oxide particle constitutes a resistance component and there is therefore a fear that the large-current performance is deteriorated.

Examples of the lithium-titanium composite oxide include titanium-based oxides such as $TiO_2$, lithium-titanium oxides having, for example, a spinel structure or ramsdellite structure and lithium-titanium composite oxides obtained by substituting a hetero element for a part of the structural element. Examples of the lithium-titanium oxide having a spinel structure include $Li_{4+x}Ti_5O_{12}$ ($0 \leq x \leq 3$) or compounds obtained by substituting a part thereof with a heteroatom. Examples of the lithium-titanium composite oxide having a ramsdellite structure include $Li_{2+y}Ti_3O_7$ ($0 \leq y \leq 3$) or compounds obtained by substituting a part thereof with a heteroatom. Examples of the titanium-based oxide include titanium-containing metal composite oxides containing Ti and at least one element selected from the group consisting of P, V, Sn, Cu, Ni, Fe and Co (e.g., $TiO_2$—$P_2O_5$, $TiO_2$—$V_2O_5$, $TiO_2$—$P_2O_5$—$SnO_2$ or $TiO_2$—$P_2O_5$—MeO (Me is at least one element selected from the group consisting of Cu, Ni, Fe and Co) besides $TiO_2$.

The titanium-containing metal composite oxide preferably has a microstructure in which a crystal phase and an amorphous phase coexist or an amorphous phase singly exists. A titanium-containing metal composite oxide having such a microstructure enables a substantially high capacity to be drawn even in a high-rate charge-discharge operation and can also be remarkably improved in cycle performance.

The lithium-titanium composite oxide is preferably a lithium titanate having a spinel structure from the viewpoint of cycle life. Among these lithium titanates, $Li_{4+x}Ti_5O_{12}$ ($0 \leq x \leq 3$) having a spinel structure is preferable because it is superior in initial charge-discharge efficiency and has a high effect on an improvement in cycle characteristics.

The molar ratio of oxygen in the lithium-titanium composite oxide is shown formally as 12 in the case of $Li_{4+x}Ti_5O_{12}$ ($0 \leq x \leq 3$) having a spinel structure and as 7 in the case of $Li_{2+y}Ti_3O_7$ ($0 \leq y \leq 3$). These molar ratios may be varied by the influence of oxygen non-stoichiometry.

The lithium-titanium composite oxide particles preferably have an average particle diameter of 1 μm or less and a specific surface area of 5 to 50 m$^2$/g. The specific surface area is measured by the BET method using $N_2$ adsorption. Lithium-titanium composite oxide particles having such an average particle diameter and a specific surface area can be improved in utilization factor, which enables a substantially high capacity to be drawn even in a high charge-discharge operation. Here, the BET specific surface area by $N_2$ gas adsorption may be measured by using a Micromeritex ASAP-2010 produced by Shimadzu Corporation and $N_2$ as the adsorbing gas.

The active material for a battery according to this embodiment may be used not only for a negative electrode but also for a positive electrode. The active material for a battery can efficiently suppress the decomposition of a non-aqueous electrolyte (e.g., a non-aqueous electrolyte solution) which occurs on the surface of a lithium composite oxide, which is the active material, even if it is applied to any of these electrodes. In other words, the effect of limiting the decomposition of the non-aqueous electrolyte solution is due to the lithium working potential (1 to 2 V vs. Li/Li$^+$) of the lithium-titanium composite oxide and therefore, the effects on both electrodes are not different. Therefore, the active material for a battery according to this embodiment may be used for both the positive electrode and the negative electrode and the same effect can be obtained.

When the active material for a battery according to this embodiment is used for the positive electrode, a metal lithium, a lithium alloy or a carbon-based material such as graphite and coke may be used for an active material of the negative electrode, which is the counter electrode.

Next, the non-aqueous electrolyte battery according to this embodiment will be described in detail.

In general, according to another embodiment, a non-aqueous electrolyte battery includes: an outer package; a positive electrode housed in the outer package; a negative electrode housed with a space from the positive electrode, for example, with a separator being interposed between these electrodes, in the outer package and including an active material; and a non-aqueous electrolyte filled in the outer package, wherein the active material comprises a lithium-titanium composite oxide particle, and a coating layer formed on at least a part of the surface of the particle and including at least one metal selected from the group consisting of Mg, Ca, Sr, Ba, Zr, Fe, Nb, Co, Ni, Cu and Si, an oxide of at least one metal selected from the group or an alloy containing at least one metal selected from the group.

The above outer package, negative electrode, non-aqueous electrolyte, positive electrode and separator will be described in detail.

1) Outer Package

As the package, a container made of a laminate film having 0.5 mm or less in thickness or a metal film having 1.0 mm or less in thickness may be used. The thickness of the metal container is more preferably 0.5 mm or less.

Examples of the form of the outer package include a flat shape (thin shape), angular shape, cylindrical shape, coin shape and button shape. Given as examples of the outer package are outer packages for small-sized batteries to be mounted on, for example, mobile electronic devices and outer packages for large-sized batteries to be mounted on two-wheeled or four-wheeled vehicles according to the dimensions of a battery.

As the laminate film, a multilayer film prepared by interposing a metal layer between resin layers may be used. The metal layer is preferably made of an aluminum foil or an aluminum alloy foil to develop a lightweight battery. As the resin layer, a high-molecular material such as a polypropylene (PP), polyethylene (PE), nylon or polyethylene terephthalate (PET) may be used. A laminate film can be molded into the shape of the outer package by carrying out thermal fusion to seal up the molded material.

The metal container is made of aluminum or an aluminum alloy. As the aluminum alloy, alloys containing elements such as magnesium, zinc and silicon are preferable. When transition metals such as iron, copper, nickel and chromium are contained in the alloy, the amount of these transition metals is preferably designed to be 100 ppm or less.

2) Negative Electrode

The negative electrode comprises a current collector and a negative electrode layer which is formed on one or both surfaces of the current collector and contains an active material, a conductive agent and a binder.

As the active material, the above active material for a battery, which comprises a lithium-titanium composite oxide particle, and a coating layer formed on at least a part of the surface of the particle and including at least one metal selected from the group consisting of Mg, Ca, Sr, Ba, Zr, Fe, Nb, Co, Ni, Cu and Si, an oxide of at least one metal selected from the group or an alloy containing at least one metal selected from the group can be used.

As the conductive agent, a carbon material may be used. Examples of the carbon material include acetylene black, carbon black, cokes, carbon fibers or graphite, and also include a metal powder such as an aluminum powder or conductive ceramics such as TiO. Among these materials, cokes and graphite which are heat-treated at 800 to 2000° C. and have an average particle diameter of 10 μm or less and carbon fibers having an average particle diameter of 1 μm or less are preferable. The BET specific surface area of the carbon material which is measured by $N_2$ adsorption is preferably 10 m$^2$/g or more.

Examples of the binder include a polytetrafluoroethylene (PTFE), polyvinylidene fluoride (PVdF), fluorine-based rubber, styrene-butadiene rubber or core-shell binder.

The proportions of the active material, the conductive agent and the binder are preferably as follows: the amount of the active material is 70% to 96% by weight, the amount of the conductive agent is 2% to 28% by weight and the amount of the binder is 2% to 28% by weight. When the amount of the conductive agent is less than 2% by weight, there is a fear that the current-collecting performance of the negative electrode layer is deteriorated and the large-current characteristics of the non-aqueous electrolyte secondary battery are therefore deteriorated. When the amount of the binder is less than 2% by weight, there is a fear as to a deterioration in binding characteristics between the negative electrode layer and the negative electrode current collector and hence a deterioration in cycle characteristics. The amounts of the conductive agent and binder are respectively preferably 28% by weight or less from the viewpoint of increasing the capacity of the battery.

The porosity of the negative electrode layer is preferably 20 to 50% by volume. The negative electrode provided with the negative electrode layer having such a porosity is highly densified and is superior in affinity to the non-aqueous electrolyte. The porosity is further preferably 25 to 40% by volume.

The current collector is preferably made of an aluminum foil or aluminum alloy foil. The current collector preferably has an average crystal particle diameter of 50 μm or less. This can outstandingly improve the strength of the current collector and therefore, the negative electrode can be highly densified by pressing with a large pressing force, enabling the battery capacity to be increased. Also, because the dissolution and corrosive deterioration of the current collector in an overcharge cycle under a high-temperature environment (40° C. or higher) can be prevented, a rise in negative electrode impedance can be suppressed. Moreover, the battery can also be improved in output characteristics, rapid charging characteristics and charge-discharge cycle characteristics. The average crystal particle diameter is more preferably 30 μm or less and even more preferably 5 μm or less.

The average crystal particle diameter is determined in the following manner. The tissue of the surface of the current collector is observed by an optical microscope to find the number n of crystal particles existing in an area of 1 mm×1 mm. The average crystal particle area S is determined by using the obtained n from the equation $S=1\times10^6/n$ (μm$^2$). From the obtained value of S, the average crystal particle diameter d (μm) is calculated according to the following equation (1).

$$d=2(S/\pi)^{1/2} \qquad (1)$$

An aluminum foil or aluminum alloy foil of which the above average crystal particle diameter is in a range of 50 μm or less is complexly affected by a plurality of factors such as material textures, impurities, processing conditions, heat treating hysteresis and annealing conditions and the above crystal particle diameter is adjusted by appropriate combination of the above factors in the production process.

The thickness of the aluminum foil or aluminum alloy foil is preferably 20 μm or less and more preferably 15 μm or less. The purity of the aluminum foil is preferably 99% by weight or higher. As the aluminum alloy, alloys containing an element such as magnesium, zinc or silicon are preferable. On the other hand, it is preferable that transition metals such as iron, copper, nickel or chromium be contained in an amount of 1% by weight or lower in the aluminum alloy.

The negative electrode is produced, for example, by suspending the active material, conductive agent and binder in a commonly-used solvent to prepare a slurry, which is then applied to a current collector, followed by drying to form a negative electrode layer, which is then pressed. Other than the above method, the active material, conductive agent and binder may be formed into a pellet, which is used as a negative electrode layer.

In the case of such a negative electrode, the peaks derived from Co, Fe, Ni or Mg are detected when the negative electrode is subjected to surface-analysis using X-ray photoelectron spectroscopy (XPS). That is, the peak derived from the $2p_{3/2}$ binding energy of Co is detected in the range of 775 to 780 eV, the peak derived from the $2p_{3/2}$ binding energy of Fe is detected in the range of 704 to 709 eV, the peak derived from the $2p_{3/2}$ binding energy of Ni is detected in the range of 850 to 854 eV and the peak derived from the $2p_{3/2}$ binding energy of Mg is detected in the range of 48 to 50 eV. The existence of the peak derived from each element in the above range shows that each element exists in a metal (alloy) state in the coating layer on the surface of the lithium-titanium composite oxide particle in the negative electrode (negative electrode layer).

The amount of Co, Fe, Ni or Mg detected by XPS component analysis is preferably 0.1 to 1.0 atomic %. If the amount of each element to be detected is less than 0.1 atomic %, there is a fear that the effect of limiting the generation of gas is impaired. If the amount of each element to be detected exceeds 1.0 atomic %, on the other hand, the coating layer itself on the surface of the lithium-titanium composite oxide particle constitutes a resistance component and there is therefore a fear that the large-current performance is deteriorated.

3) Non-Aqueous Electrolyte

Examples of the non-aqueous electrolyte include a liquid non-aqueous electrolyte and a liquid non-aqueous electrolyte obtained by making a composite of a liquid electrolyte and a high-molecular material.

The liquid non-aqueous electrolyte is prepared by dissolving an electrolyte into an organic solvent in a concentration of 0.5 to 2.5 mol/L.

Examples of the electrolyte include lithium salts such as lithium perchlorate ($LiClO_4$), lithium hexafluorophosphate ($LiPF_6$), lithium tetrafluorophosphate ($LiPF_4$), lithium arsenichexafluoride ($LiAsF_6$), lithium trifluoromethanesulfonate ($LiCF_3SO_3$) and bistrifluoromethylsulfonylimide lithium ($LiN(CF_3SO_2)_2$) or mixtures of these lithium salts. Those which are scarcely oxidized even at a high potential are preferable, and $LiPF_6$ is most preferable.

The organic solvent may be used a single solvent or mixtures of solvents selected from cyclic carbonates such as propylene carbonate (PC), ethylene carbonate (EC) and vinylene carbonates; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolane (SL).

Examples of the high-molecular material include a polyvinylidene fluoride (PVdF), polyacrylonitrile (PAN) and polyethylene oxide (PEO).

The organic solvent is preferably a mixed solvent obtained by blending two or more solvents selected from the group consisting of propylene carbonate (PC), ethylene carbonate (EC) and γ-butyrolactone (GBL). The organic solvent is further preferably γ-butyrolactone (GBL). This reason is as follows.

The lithium-titanium composite oxide phase, which is a chief material of the negative electrode active material, charges and discharges lithium ions at a potential range of 1 to 2 V (vs. $Li/Li^+$). However, the reduction and decomposition of the non-aqueous electrolyte are scarcely caused in this potential range, so that a coating film, which is a reduction product, is formed with difficulty on the surface of the lithium-titanium composite oxide. Therefore, when the lithium-titanium composite oxide exists in the situation where lithium is charged therein, that is, in fully charged state, lithium ions charged in the lithium-titanium composite oxide gradually diffuse into the electrolyte solution, causing the so-called self discharge. Such self-discharge arises significantly when the battery is put into a high-temperature storage environment.

Of these organic solvents, γ-butyrolactone is more reducible than a chain carbonate or cyclic carbonate. These organic compounds described in the order of reducibility are as follows: γ-butyrolactone>>>ethylene carbonate>propylene carbonate>>dimethyl carbonate>methylethyl carbonate>diethyl carbonate. Therefore, a favorable coating film can be formed on the surface of the lithium-titanium composite oxide even in the working potential range of the lithium-titanium composite oxide by placing γ-butyrolactone in the electrolyte solution. As a result, self-discharge can be suppressed, thereby making it possible to improve the high-temperature storage characteristics of the non-aqueous electrolyte battery.

The mixed solvent obtained by blending two or more solvents selected from the group consisting of propylene carbonate (PC), ethylene carbonate (EC) and γ-butyrolactone (GBL), and a mixed solvent including γ-butyrolactone can likewise limit the self-discharge, thereby making it possible to improve the high-temperature storage characteristics of the non-aqueous electrolyte battery.

γ-butyrolactone is preferable because a high-quality protective coating film can be formed by blending it in an amount of 40% to 95% by volume based on the organic solvent.

4) Positive Electrode

The positive electrode comprises a current collector and a positive electrode layer which is formed on one or both surfaces of the current collector and contains an active material, a conductive agent and a binder.

The current collector is preferably made of an aluminum foil or an aluminum alloy foil containing elements such as Mg, Ti, Zn, Mn, Fe, Cu and Si.

The active material may be used, for example, an oxide or a polymer.

The oxides may be used, for example, manganese oxide ($MnO_2$), iron oxide, copper oxide and nickel oxide in which lithium is charged, lithium-manganese composite oxide (e.g., $Li_xMn_2O_4$ or $Li_xMnO_2$), lithium-nickel composite oxide (e.g., $Li_xNiO_2$), lithium-cobalt composite oxide (e.g., $Li_xCoO_2$), lithium-nickel-cobalt composite oxide (e.g., $LiNi_{1-y}Co_yO_2$), lithium-manganese-cobalt composite oxide (e.g., $Li_xMn_yCo_{1-y}O_2$), spinel type lithium-manganese-nickel composite oxide (e.g., $Li_xMn_{2-y}Ni_yO_4$), lithium-phosphorous oxide having an olivine structure (e.g., $Li_xFePO_4$, $Li_xFe_{1-y}Mn_yPO_4$ and $Li_xCoPO_4$), iron sulfate ($Fe_2(SO_4)_3$) or vanadium oxide (e.g., $V_2O_5$). Here, x and y are preferably $0<x\le1$ and $0<y\le1$, respectively.

The polymer may be used, for example, conductive polymer materials such as a polyaniline and polypyrrole and disulfide-based polymers may be used. Also, sulfur (S), fluorocarbon and the like.

Preferable examples of the active material include lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($Li_xNi_{1-y}Co_yO_2$), spinel type lithium-manganese-nickel composite oxide ($Li_xMn_{2-y}Ni_yO_4$), lithium-manganese-cobalt composite oxide ($Li_xMn_yCo_{1-y}O_2$) and lithium ironphosphate ($Li_xFePO_4$) which each provide a high positive electrode voltage. Here, x and y preferably satisfy the following relations: $0<x\le1$ and $0<y\le1$.

The active material is more preferably a lithium-cobalt composite oxide or lithium-manganese composite oxide. Because these materials have high ion conductivity, there are difficulties in carrying out the process in which the diffusion of lithium ions in the active material is the rate-determining step when these materials are combined with the negative electrode material of the embodiment. Therefore, these active materials are superior in adaptability to the lithium-titanium composite oxide in the negative electrode active material used in this embodiment.

In the non-aqueous electrolyte battery according to the embodiment, a higher effect can be obtained by combining a positive electrode including a Mn-containing active material, which gives rise to the elution of Mn as mentioned above, with the negative electrode including an active material which comprises a lithium-titanium composite oxide particle, and a coating layer formed on at least a part of the surface of the particle and including at least one metal selected from the group consisting of Mg, Ca, Sr, Ba, Zr, Fe, Nb, Co, Ni, Cu and Si, an oxide of at least one metal selected from the group or an alloy containing at least one metal selected from the group. An even higher effect can be obtained when a manganese-containing lithium-transition metal composite oxide having a spinel structure is used as the positive electrode active material. Examples of the manganese-containing lithium-transition metal composite oxide having a spinel structure include $Li_xMn_{2-y}M_yO_4$ ($0\le x\le1.2$ and $0\le y\le1$, M is an element other than Mn). As the M element, Co and Al may be used to produce an effect of decreasing the elution amount of Mn.

The primary particle diameter of the active material is designed to be 100 nm to 1 μm, which is preferable as regards handling in industrial production and to progress the diffusion of lithium ions in a solid smoothly.

The specific surface area of the active material is designed to be 0.1 to 10 m$^2$/g, which is preferable because the charge/discharge site of lithium ions can be sufficiently secured, handling in industrial production is made easy and more favorable charge-discharge cycle characteristics can be secured.

The conductive agent may be used, for example, a carbonaceous material such as acetylene black, carbon black or graphite. These conductive agents can improve the current-collecting ability and can suppress the contact resistance with the current collector.

The binder may be used a polytetrafluoroethylene (PTFE), polyvinylidene fluoride (PVdF) or fluorine-based rubber.

With regard to each ratio of the active material, conductive agent and binder to be compounded, it is preferable that the active material is 80% to 95% by weigh, the conductive agent is 3% to 18% by weight and the binder is 2% by to 17% by weight. The conductive agent produces the high effect when it is compounded in an amount of 3% by weight or more. Also, the conductive agent can reduce the decomposition of the non-aqueous electrolyte on the surface thereof under a high-temperature storage condition when it is compounded in an amount of 10% by weight or less. The binder succeeds in obtaining a satisfactory electrode strength when it is compounded in an amount of 2% by weight or more. Also, when the binder is compounded in an amount of 10% by weight or less, it reduces the amount of the insulating material in the electrode to thereby reduce the internal resistance.

The positive electrode is produced by suspending the active material, the conductive agent and the binder in an appropriate solvent to prepare a slurry, which is then applied to a positive electrode current collector, followed by drying to produce a positive electrode layer, followed by pressing. Other than the above, the active material, conductive agent and binder may be formed into a pellet, which is used as the positive electrode layer.

5) Separator

Examples of the separator include porous films or synthetic resin nonwoven fabrics containing a polyethylene, polypropylene, cellulose or polyvinylidene fluoride (PVdF). Of these materials, since a porous film made of a polyethylene or polypropylene melts at a fixed temperature to be able to cut off current, it is favorable from the viewpoint of improving safety.

Figure 1:
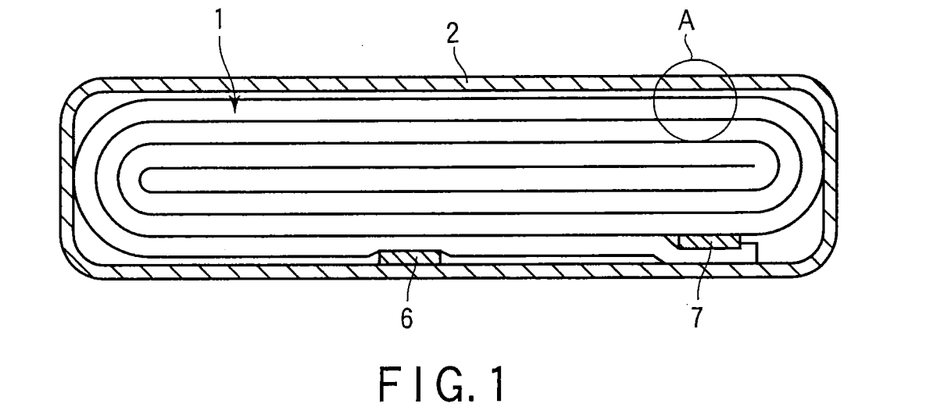
FIG. 1 is a sectional view showing a flat type non-aqueous electrolyte battery according to an embodiment.
Figure 2:
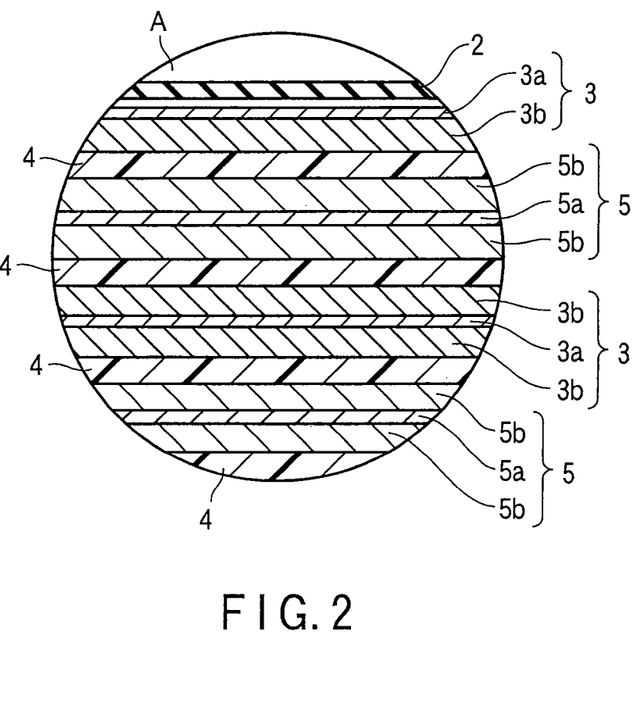
FIG. 2 is an enlarged sectional view of the part A in FIG. 1.

Next, the non-aqueous electrolyte battery (e.g., a flat type non-aqueous electrolyte battery provided with an outer package constituted of a laminate film) according to this embodiment will be described in detail with reference to FIGS. 1 and 2. FIG. 1 is a sectional view of a thin type non-aqueous electrolyte battery and FIG. 2 is an enlarged sectional view of the part A in FIG. 1. Each of these drawings is a typical view for describing the invention and for promoting the understanding of the invention. Though there is a case where shapes, dimensions and ratios of the battery described in these drawings differ from those of the actual equipment, the designs of these parts may be appropriately changed in consideration of the following invention and known technologies.

A flattened wound electrode group 1 is housed in a bag-shaped outer package 2 made of a laminate film obtained by interposing an aluminum foil between two resin layers. The flattened wound electrode group 1 is constructed by spirally wounding and press-molding a laminate comprising mentioning from outside, a negative electrode 3, a separator 4, a positive electrode 5 and a separator 4. As shown in FIG. 2, the negative electrode 3 constituting the outermost husk has a structure in which a negative electrode layer 3b is formed on one surface of a current collector 3a, the negative electrode layer 3b containing an active material which comprises a lithium-titanium composite oxide particle, and a coating layer formed on at least a part of the surface of the particle and including at least one metal selected from the group consisting of Mg, Ca, Sr, Ba, Zr, Fe, Nb, Co, Ni, Cu and Si, an oxide of at least one metal selected from the group or an alloy containing at least one metal selected from the group. Other negative electrodes 3 are constituted by forming negative electrode layers 3b on the both surfaces of the current collectors 3a. The positive electrode 5 is structured by forming positive electrode layers 3b on the both surfaces of the current collector 5a.

In the vicinity of the outside peripheral end of the flattened wound electrode group 1, a negative electrode terminal 6 is connected to the current collector 3a of the negative electrode 3 in the outermost husk and a positive electrode terminal 7 is connected to the current collector 5a of the positive electrode 5 disposed inside of the negative electrode. The negative electrode terminal 6 and positive electrode terminal 7 are protruded out of the bag-shaped outer package 2 from an opening formed therein. For example, a liquid non-aqueous electrolyte is injected from an opening of the bag-shaped outer package 2. The opening of the bag-shaped outer package 2 is heat-sealed with holding the negative electrode terminal 6 and positive electrode terminal 7 to thereby completely seal the coiled electrode group 1 and the liquid non-aqueous electrolyte.

The negative electrode terminal may be used, for example, a material having electrical stability and conductivity within a potential of 1.0 to 3.0 V with respect to a lithium ion metal. Examples of the material of the negative electrode terminal include aluminum and aluminum alloys containing elements such as Mg, Ti, Zn, Mn, Fe, Cu and Si. The negative electrode terminal is preferably made of the same material as the current collector in order to reduce the contact resistance with the current collector.

The positive electrode terminal may be used, for example, a material having electrical stability and conductivity within a potential of 3.0 to 4.25 V with respect to a lithium ion metal. Examples of the material of the positive electrode terminal include aluminum and aluminum alloys containing elements such as Mg, Ti, Zn, Mn, Fe, Cu and Si. The positive electrode terminal is preferably made of the same material as the current collector in order to reduce the contact resistance with the current collector.

According to the non-aqueous electrolyte battery of such embodiment, it is provided with the negative electrode including the active material which comprises a lithium-titanium composite oxide particle, and a coating layer formed on at least a part of the surface of the particle and including at least one metal selected from the group consisting of Mg, Ca, Sr, Ba, Zr, Fe, Nb, Co, Ni, Cu and Si, an oxide of at least one metal selected from the group or an alloy containing at least one metal selected from the group, whereby the decomposition reaction between the non-aqueous electrolyte (e.g., a non-aqueous electrolyte solution) and the surface of the lithium-titanium composite oxide particles can be efficiently suppressed. As a result, the generation of gas on the surface of the negative electrode can be suppressed and a non-aqueous electrolyte battery reduced in the swelling of the outer package can be provided. Such an effect can be obtained more significantly when this negative electrode is combined with a positive electrode containing an Mn-containing positive electrode active material.

In general, according to another embodiment, a battery pack includes a plurality of the above non-aqueous electrolyte batteries, for example unit cells, which are electrically connected each other in series, in parallel, or both in series and in parallel.

The non-aqueous electrolyte battery according to this embodiment is preferably used as each of the unit cells forming a battery module. The obtained battery pack has excellent cycle characteristics.

In the decomposition reaction of the non-aqueous electrolyte which arises on the surface of the negative electrode and on the surface of the lithium-titanium composite oxide used as the active material, the amount of reaction varies corresponding to the environmental temperature and increases with increase in environmental temperature as mentioned above. The battery module is constituted, for example, by combining a plurality of unit cells. Therefore, the heat of a unit cell disposed at the outermost position tends to be released and therefore the temperature of the unit cell tends to be decreased. On the other hand, the heat of a unit cell disposed inside tends to be scarcely released and therefore the temperature of the unit cell tends to be scarcely decreased. In other words, the temperature in the battery module varies depending on the position, and therefore the temperatures of the unit cells tend to be different from each other. As a result, the amount of the non-aqueous electrolyte solution to be decomposed is larger in unit cells disposed inside than in unit cells disposed outside. The decomposition of the non-aqueous electrolyte solution on the surface of the negative electrode reduces the charge-discharge efficiency of the negative electrode, which destroys the balance in capacity between the positive electrode and the negative electrode. Such adverse capacity balance causes a part of the batteries to be put in an overcharge state, which shortens the cycle life of the battery module.

In the case of constituting a battery module by using the non-aqueous electrolyte battery according to this embodiment as unit cells, the amount of the decomposition of the non-aqueous electrolyte solution in all of these unit cells can be reduced, which makes the battery module resistant to the influence of temperature unevenness, so that the cycle life of the battery module can be prolonged.

One example of such a battery pack will be explained in detail with reference to FIGS. 3 and 4. The single cell can be employed the flatting type battery as shown in FIG. 1.

A plurality of single cells 21, each formed of the flatting type non-aqueous electrolyte battery shown in FIG. 1, are laminated in such a manner that the negative electrode terminal 6 and the positive electrode terminal 7, both being externally led out, are arrayed to extend in the same direction and that they are clamped together by means of an adhesive tape 22, thereby creating a combined battery 23. These single cells 21 are electrically connected with each other in series as shown in FIG. 4.

A printed wiring board 24 is disposed to face the side wall of each of the single cells 21 where the negative electrode terminal 6 and the positive electrode terminal 7 are externally led out. On this printed wiring board 24 are mounted a thermistor 25, a protection circuit 26, and a terminal 27 for electrically connecting the printed wiring board 24 with external instruments. It should be noted that in order to prevent unwanted electric connection with the wirings of the combined battery 23, an insulating plate (not shown) is attached to the surface of the printed wiring board 24 that faces the combined battery 23.

A lead 28 for the positive electrode is electrically connected, through one end thereof, with the positive electrode terminal 7 which is located at the lowest layer of the combined battery 23. The other end of the lead 28 is inserted into and electrically connected with a connector 29 for the positive terminal of the printed wiring board 24. A lead 30 for the negative electrode is electrically connected, through one end thereof, with the negative electrode terminal 6 which is located at the highest layer of the combined battery 23. The other end of the lead 30 is inserted into and electrically connected with a connector 31 for the negative terminal of the printed wiring board 24. These connectors 29 and 31 are electrically connected, through the interconnects 32 and 33 formed on the printed wiring board 24, with the protection circuit 26.

The thermistor 25 is used for detecting the temperature of single cells 21 and the signals thus detected are transmitted to the protection circuit 26. This protection circuit 26 is designed to cut off, under prescribed conditions, the wiring 34a of plus-side and the wiring 34b of minus-side which are interposed between the protection circuit 26 and the terminal 27 for electrically connecting the printed wiring board 24 with external instruments. The expression of "under prescribed conditions" herein means the conditions where the temperature detected by the thermistor 25 becomes higher than a predetermined temperature for example. Further, the expression of "under prescribed conditions" herein also means the conditions where the over-charging, over-discharging and over-current of the single cells 21 are detected. The detection of this over-charging is performed against the single cells 21 individually or entirely. In the case where the single cells 21 are to be detected individually, either the voltage of cell may be detected or the potential of the positive electrode or negative electrode may be detected. In the latter case, a lithium electrode is inserted, as a reference electrode, into individual cells 21. In the case of the battery pack shown in FIGS. 3 and 4, a wiring 35 is connected with each of the single cells 21 for detecting the voltage thereof and the signals detected are transmitted, through this wiring 35, to the protection circuit 26.

On all of the sidewalls of the combined battery 23 excepting one sidewall where the negative electrode terminal 6 and the positive electrode terminal 7 are protruded, a protective sheet 36 made of rubber or synthetic resin is disposed, respectively.

The combined battery 23 is housed, together with each of protective sheet 36 and the printed wiring board 24, in a case 37. Namely, the protective sheet 36 is disposed on the opposite inner sidewalls constituting the longer sides of the case 37 and on one inner sidewall constituting one shorter side of the case 37. On the other sidewall constituting the other shorter side of the case 37 is disposed the printed wiring board 24. The combined battery 23 is positioned in a space which is surrounded by the protective sheet 36 and the printed wiring board 24. A cap 38 is attached to the top of the case 37.

In this case, the battery module 23 may be secured by using a heat-shrinkable tube in place of the adhesive tape 22. In addition, a protective sheet is disposed on each side surface of the battery module and the heat-shrinkable tube is wound around the protective sheets. Then, the heat-shrinkable tube is heat-shrunk to closely bind the battery module.

Figure 3:
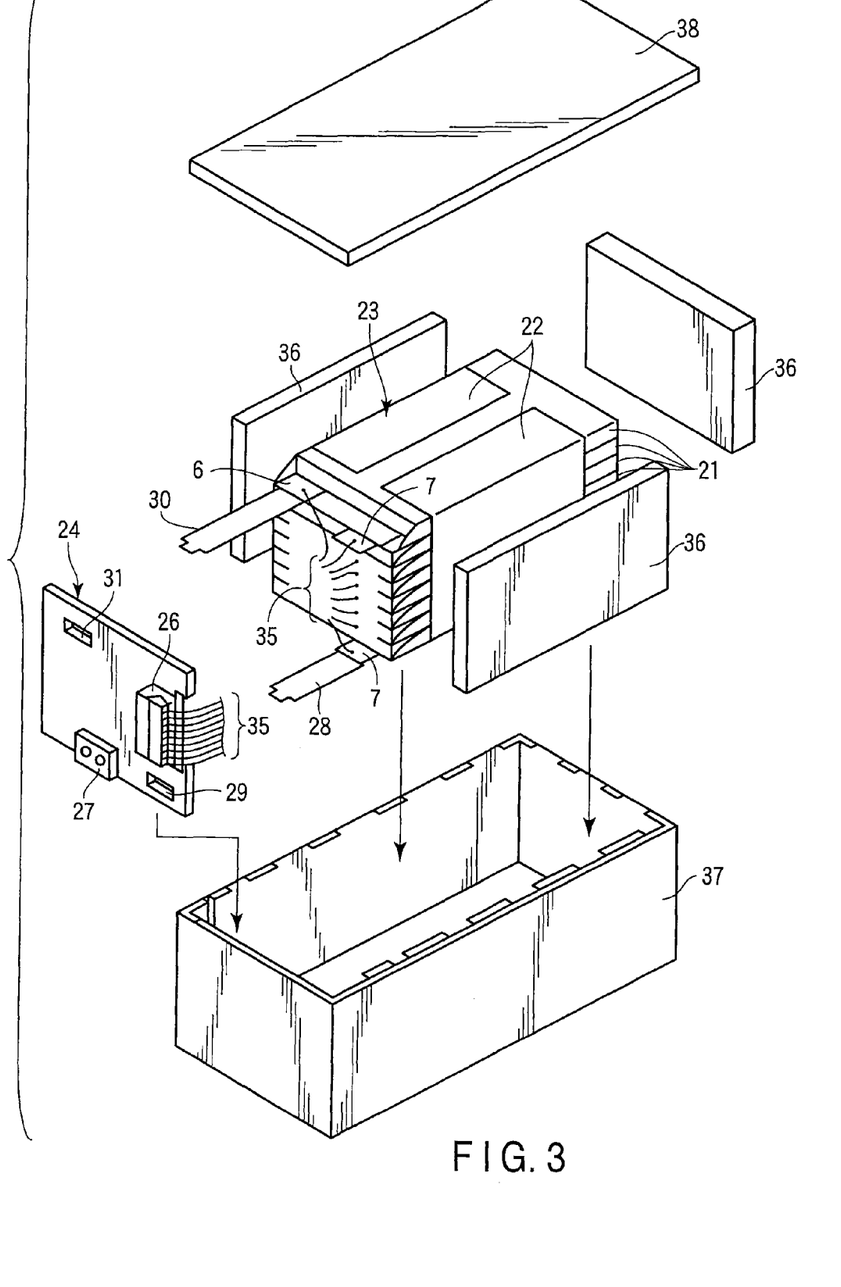
FIG. 3 is an exploded perspective view showing a battery pack according to an embodiment.
Figure 4:
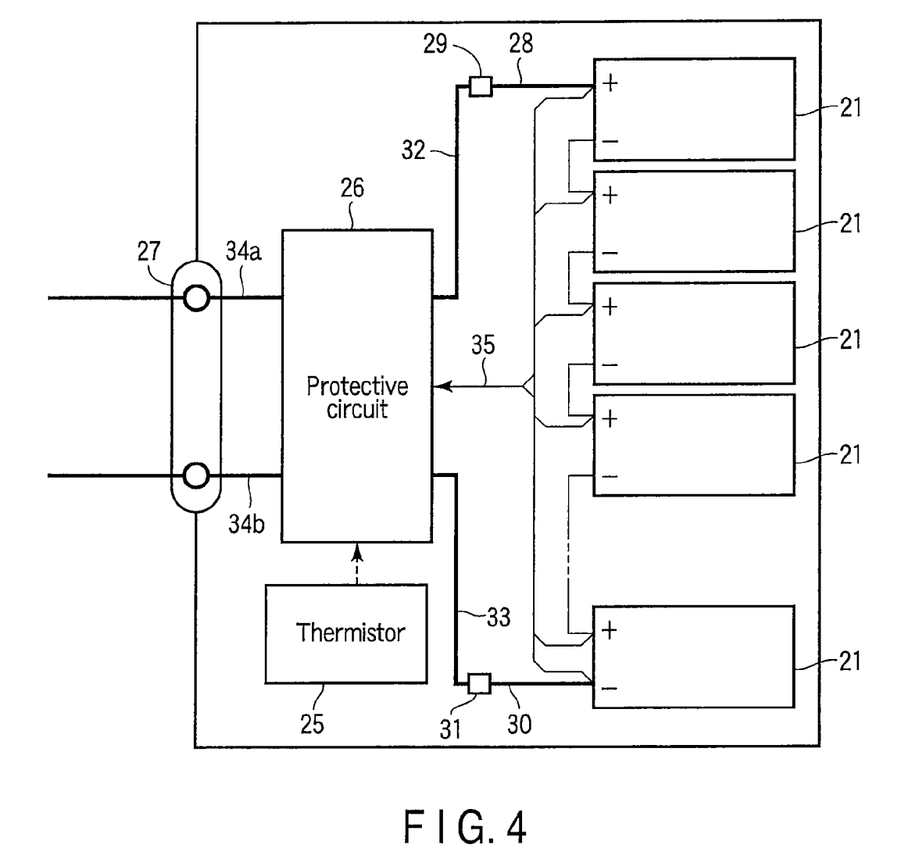
FIG. 4 is a block view of a battery pack shown in FIG. 3.

In FIGS. 3 and 4, though the unit cells 21 are shown in the embodiment in which they are connected in series, they may be connected in parallel or in a combination of series and parallel to increase the capacity of the battery. Also, the produced battery packs may be further connected in series or in parallel.

Also, the structure of the battery pack is appropriately changed according to use. The applications of the battery pack are preferably those for which cycle characteristics in large-current characteristics are desired. More specifically, examples of applications include power sources used in, for example, digital cameras and power sources used in automobiles, for example, hybrid two-wheeled or four-wheeled electromobiles, two-wheeled or four-wheeled electric cars and power-assisted bicycles. Applications as power sources for automobiles are preferable.

As mentioned above, a non-aqueous electrolyte battery superior in high-temperature characteristics can be obtained by using a non-aqueous electrolyte containing either a mixture solvent obtained by mixing two or more solvents selected from the group consisting of propylene carbonate (PC), ethylene carbonate (EC) and γ-butyrolactone (GBL) or γ-butyrolactone (GBL). A battery pack provided with a battery module having a plurality of these non-aqueous electrolyte batteries is preferable as a power source for automobiles.

The present invention will be described in more detail by way of examples. However, these examples are not intended to limit the scope of the present invention.

Example 1

<Production of a Positive Electrode>

First, 90% by weight of a lithium-manganese oxide ($LiMn_{1.9}Al_{0.1}O_4$) powder having a spinel type structure which was used as a positive electrode active material, 5% by weight of acetylene black used as a conductive agent and 5% by weight of a polyvinylidene fluoride (PVdF) were added in N-methylpyrrolidone (NMP) and these compounds were mixed to prepare a slurry. This slurry was applied to both surfaces of a current collector made of an aluminum foil 15 μm in thickness, followed by drying and pressing to produce a positive electrode having an electrode density of 2.9 g/cm$^3$.

<Production of a Lithium-Titanium Composite Oxide Particle (1)>

First, $Li_2CO_3$ and anatase type $TiO_2$ were mixed such that the molar ratio of Li:Ti was 4:5 and the mixture was calcined at 850° C. for 12 hours in air to thereby obtain a spinel type lithium-titanium composite oxide $Li_4Ti_5O_{12}$ (precursor).

The synthesized $Li_4Ti_5O_{12}$ (92 g) was poured into a solution obtained by dissolving $Mg(OH)_2$ (0.175 g) in water, followed by stirring and drying, and then calcined at 400° C. for 3 hours to obtain a granular negative electrode active material.

The obtained negative electrode active material was subjected to FIB-TEM analysis and EDX analysis. As a result, it was confirmed that an Mg oxide layer, i.e., a coating layer having 5 to 10 nm in thickness was formed over the entire surface of $Li_4Ti_5O_{12}$ particles. Also, it was found from the result of XPS that Mg existed in the form of $Mg^{2+}$, and it was therefore inferred that the Mg oxide was MgO. Also, it was confirmed from the result of powder X-ray diffraction method that the Mg oxide was amorphous.

<Production of a Negative Electrode>

90% by weight of the obtained lithium-titanium composite oxide particles having Mg oxide layer as the active material, 5% by weight of coke (d002: 0.3465 nm, average particle diameter: 3 μm) calcined at 1200° C. as a conductive agent and 5% by weight of a polyvinylidene fluoride (PVdF) were added in N-methylpyrrolidone (NMP) and these components were mixed to prepare a slurry. This slurry was applied to both surfaces of a current collector made of an aluminum foil 15 μm in thickness and dried, followed by pressing to produce a negative electrode having an electrode density of 2.0 g/cm³.

The average particle diameter of the lithium-titanium composite oxide particles was 0.96 μm. The method for measuring the average particle diameter will be described below.

The average particle diameter was measured in the following manner by using a laser diffraction type distribution-measuring device (trade name: SALD-3000, produced by Shimadzu Corporation). First, a beaker was charged with about 0.1 g of a sample, a surfactant and 1 to 2 mL of distilled water, which were stirred sufficiently, and then the mixture was poured into a stirring water bath and the distribution of luminosity was measured 64 times at intervals of 2 seconds to analyze the data of the grain size distribution.

<Production of an Electrode Group>

The above-described positive electrode, a sheet of separator made of a porous polyethylene film having a thickness of 25 μm, the above-described negative electrode, and another sheet of separator made of the same kind of film as described above are laminated in the mentioned order and then spirally wound to form a wound body, which was thermally press at a temperature of 90° C. to manufacture a flattened wound electrode group. The obtained electrode group was housed in a pack made of an aluminum laminate film, which was then dried under vacuum at 80° C. for 24 hours.

<Preparation of a Liquid Non-Aqueous Electrolyte>

1.5 mol/L of $LiBF_4$ used as an electrolyte was dissolved in a mixed solution prepared by blending ethylene carbonate (EC) and γ-butyrolactone (GBL) in a ratio by volume of 1:2 to prepare a liquid non-aqueous electrolyte.

The liquid non-aqueous electrolyte was poured into the laminate film pack in which the electrode group was housed. After that, the pack was completely sealed by heat sealing to assemble a non-aqueous electrolyte secondary battery which had the structure shown in FIG. 1 and had a width of 70 mm, a thickness of 6.5 mm and a height of 120 mm.

Comparative Example 1

A non-aqueous electrolyte secondary battery was assembled in the same manner as in Example 1 except that the precursor (spinel type lithium-titanium composite oxide $Li_4Ti_5O_{12}$), which was synthesized in Example 1 and was not surface-modified, was used as the negative electrode active material.

Examples 2 to 14 and Comparative Examples 2 to 4

Non-aqueous electrolyte secondary batteries were assembled in the same manner as in Example 1 except that each of the coating layers made of the coating materials shown in the following Table 1 is formed on the entire surface of the spinel type lithium-titanium composite oxide particle. When the coating material is a metal, the electroless plating method was used as the coating method. Also, all of these coating materials were amorphous and had a thickness of 5 to 10 nm.

Example 15

A non-aqueous electrolyte secondary battery was assembled in the same manner as in Example 1 except that the synthesized $Li_4Ti_5O_{12}$ obtained Example 1 was used as an active material and 1500 ppm of $Fe(BF_4)_2$ was added to liquid non-aqueous electrolyte.

Example 16

A non-aqueous electrolyte secondary battery was assembled in the same manner as in Example 1 except that the synthesized $Li_4Ti_5O_{12}$ obtained Example 1 was used as an active material and 1500 ppm of $Ni(BF_4)_2$ was added to liquid non-aqueous electrolyte.

Example 17

A non-aqueous electrolyte secondary battery was assembled in the same manner as in Example 1 except that the synthesized $Li_4Ti_5O_{12}$ obtained Example 1 was used as an active material and 1500 ppm of $Co(BF_4)_2$ was added to liquid non-aqueous electrolyte.

Each of batteries obtained in Examples 1 to 17 and Comparative Examples 1 to 4 was subjected to a high-temperature storage test conducted at 60° C. for 4 weeks in a 2.55 V-charged state to measure the thicknesses of the battery before and after it was stored. From these thicknesses of the battery, a change in the thickness of the battery was determined according to the following equation.

Variation in the thickness of the battery (times)= (Thickness of the battery after stored/Thickness of the battery before stored)

Also, with regard to each battery obtained in Examples 1 to 17 and Comparative Examples 1 to 4, the DC resistance of the battery before the battery was stored was measured to calculate the ratio (times) of the resistance of the battery to the reference resistance, which was that of the battery of Comparative Example 1, using the no material covering negative electrode active material. These results are shown in Table 1 below. In this case, the DC resistance (R) was calculated from the difference in voltage between 10 C discharge and 1 C discharge. The battery was allowed to discharge under 10 C current ($C_1$) and 1 C current ($C_2$) for 0.2 seconds to measure the voltages $V_1$ and $V_2$ after discharged respectively and the DC resistance was calculated from the equation:

$$R=(V_2-V_1)/(C_1-C_2).$$

TABLE 1

| | Coating material of spinel lithium-titanium composite oxide particles | Change in the thickness of the battery (times) | Battery resistance (times) |
| --- | --- | --- | --- |
| Comparative Example 1 | Non | >2 | 1.00 |
| Example 1 | Mg oxide(MgO) | 1.05 | 0.95 |
| Example 2 | Ca oxide(CaO) | 1.07 | 1.05 |
| Example 3 | Sr oxide(SrO) | 1.08 | 1.05 |
| Example 4 | Ba oxide(BaO) | 1.08 | 1.05 |
| Example 5 | Zr oxide($Zr_2O$) | 1.08 | 1.05 |
| Example 6 | Fe oxide(FeO) | 1.05 | 1.00 |
| Example 7 | Nb oxide($Nb_2O_5$) | 1.09 | 1.05 |
| Example 8 | Ni oxide(NiO) | 1.06 | 1.05 |
| Example 9 | Co oxide(CoO) | 1.06 | 1.00 |
| Example 10 | Si oxide($SiO_2$) | 1.09 | 1.05 |
| Example 11 | Fe | 1.04 | 1.00 |
| Example 12 | Ni | 1.03 | 1.05 |
| Example 13 | Co | 1.04 | 1.00 |
| Example 14 | Cu oxide(CuO) | 1.12 | 1.00 |
| Example 15 | Fe($Fe(BF_4)_2$) | 1.03 | 0.90 |
| Example 16 | Ni($Ni(BF_4)_2$) | 1.00 | 0.95 |
| Example 17 | Co($Co(BF_4)_2$) | 1.02 | 0.90 |
| Comparative Example 2 | Mn | >1.5 | 1.00 |
| Comparative Example 3 | Mn oxide($MnO_2$) | >1.3 | 1.05 |

TABLE 1-continued

| | Coating material of spinel lithium-titanium composite oxide particles | Change in the thickness of the battery (times) | Battery resistance (times) |
|---|---|---|---|
| Comparative Example 4 | Mg sulfate(MgSO$_4$) | >1.2 | 1.24 |

As is apparent from Table 1, it is found that the secondary battery of Comparative Example 1 using a negative electrode active material, which is not treated by surface-modification such as metal coating, is swelled and increased in change in the thickness of the battery when the battery is stored at high temperatures.

It is understood that each secondary battery obtained in Examples 1 to 13 using a negative electrode active material which is surface-modified, on the other hand, is reduced in the swelling of the battery and in change in the thickness of the battery when it is stored at high temperatures. It is understood that, in particular, the battery of Example 1 used the negative electrode active material having a coating layer made of Mg oxide and the batteries of Examples 11 to 13 and 15 to 17 used the negative electrode active materials having coating layers made of Fe metal, Ni metal and Co metal respectively are further reduced in the swelling of the battery.

On the other hand, it is also found that the secondary batteries of Comparative Examples 2 and 3 using a negative electrode active materials having coating layers made of an Mn and an Mn oxide formed on its surface, respectively, and the secondary battery of Comparative Example 4 using a negative electrode active materials having a coating layer made of an Mg sulfate are increased in the swelling of the battery and also in change in the thickness of the battery similarly to the battery of Comparative Example 1 which is not surface-modified.

It is also found that favorable large-current characteristics are obtained by each secondary battery of Examples 1 to 17 from the fact that though the negative electrode active material of the negative electrode of each secondary battery of Examples 1 to 17 is modified by a specific surface coating material, it exhibits the same battery resistance as that of Comparative Example 1 provided with the negative electrode containing a negative electrode active material not formed a coating layer on its surface.

Moreover, the negative electrode of a non-aqueous electrolyte battery assembled in the same manner as in Example 13 or Comparative Example 1 was subjected to XPS analysis.

The non-aqueous electrolyte battery of Example 13 was decomposed in an inert atmosphere before the evaluation test to take out the negative electrode. The negative electrode taken out was cut into a desired size to make a sample, which was then subjected to XPS analysis under the following condition while it was kept in an inert atmosphere.

1. Pretreatment

For all samples are measured under no contacting with an atmosphere, sampling each samples and transferring each samples to an instrument were carried out in an inert atmosphere.

2. Measuring Conditions

Instrument: Quantera SXM (manufactured by PHI)
Exciting X-ray: Monochromatic Al K$\alpha_{1,2}$ ray (1486.6 eV)
X-ray diameter: 200 μm
Photoelectron escape angle: 45° C. (inclination of a detector with respect to the surface of the sample)

3. Data Processing

Smoothing: 9 points smoothing
Calibration of the abscissa: The main peak of C1s is set to 284.6 eV.

Figure 5:
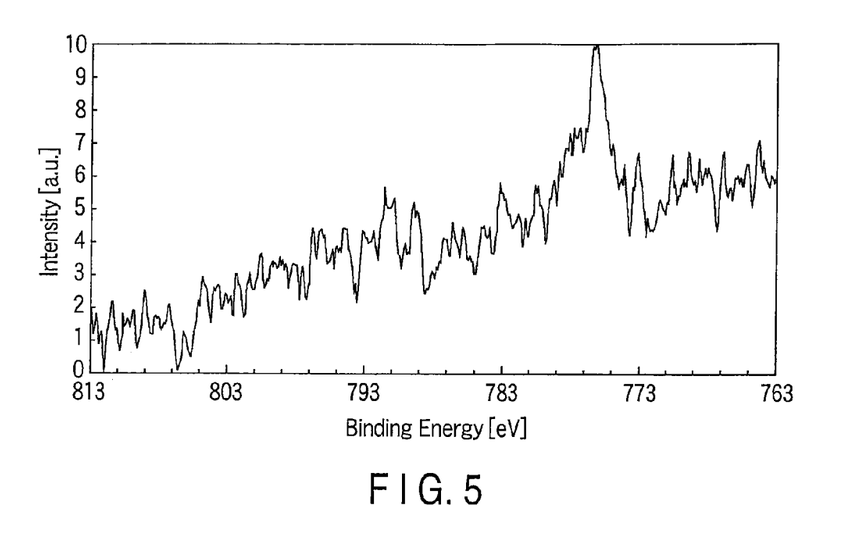
FIG. 5 is an XPS chart of a negative electrode taken out from a non-aqueous electrolyte battery of Example 11 before an evaluation test.

The obtained XPS chart is shown in FIG. 5. The peak derived from the $2p_{3/2}$ binding energy of Co was detected at 776.6 eV from this XPS chart, which suggested that Co existing on the surface of the negative electrode was in a metal state. Also, as a result of the composition analysis using XPS, the existential amount of Co was 0.5 atomic %.

Figure 6:
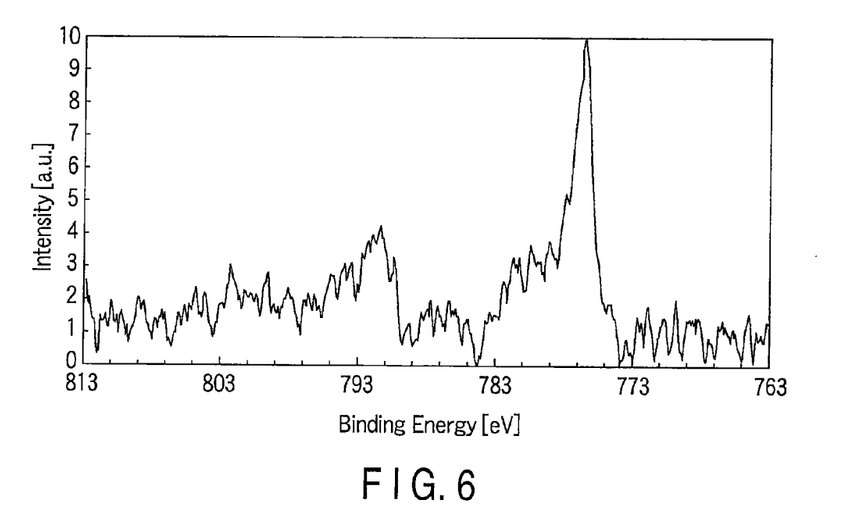
FIG. 6 is an XPS chart of a negative electrode taken out from the non-aqueous electrolyte battery of Example 11 after the evaluation test.

Also, the non-aqueous electrolyte battery of Example 13 was decomposed in an inert atmosphere after the above evaluation test to take out the negative electrode. The negative electrode taken out was subjected to XPS analysis in the same condition as above. The obtained XPS chart is shown in FIG. 6. In the case of the negative electrode in the battery of Example 13, the peak derived from the $2p_{3/2}$ binding energy of Co was detected at 776.6 eV also after the evaluation test like that detected before the evaluation test from this XPS chart, which suggested that Co existed in a metal state on the surface of the negative electrode.

Figure 7:
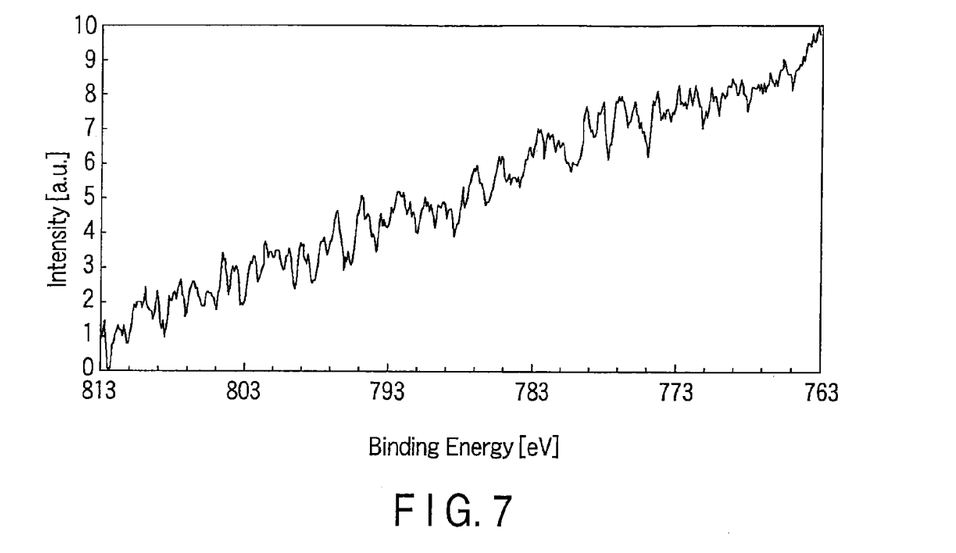
FIG. 7 is an XPS chart of a negative electrode taken out from a non-aqueous electrolyte battery of Comparative Example 1 before an evaluation test.
Figure 8:
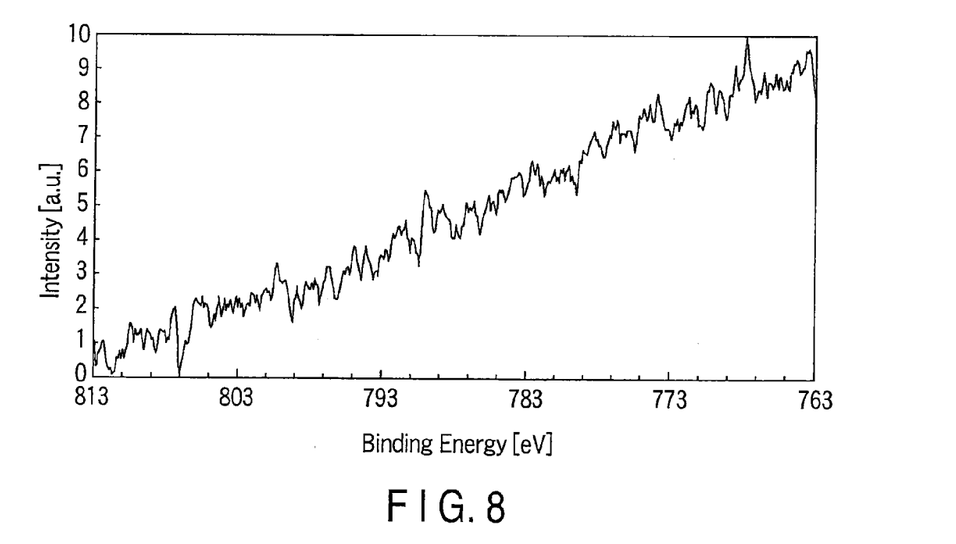
FIG. 8 is an XPS chart of a negative electrode taken out from the non-aqueous electrolyte battery of Comparative Example 1 after the evaluation test.

On the other hand, the non-aqueous electrolyte battery of Comparative Example 1 was decomposed in an inert atmosphere before the above evaluation test to take out the negative electrode. The negative electrode taken out was subjected to XPS analysis in the same condition as above. Also, the non-aqueous electrolyte battery of Comparative Example 1 was decomposed in an inert atmosphere after the above evaluation test to take out the negative electrode. The negative electrode taken out was subjected to XPS analysis in the same condition as above. The obtained XPS charts of the negative electrode before and after the test are shown in FIGS. 7 and 8, respectively. It is found from these XPS charts that in the negative electrode in the battery of Comparative Example 1, the existence of Co is not confirmed either before or after the test.

Each of batteries obtained in Examples 15 to 17 degreases a change in the thickness, and has more excellent large-current characteristics compared with each of batteries obtained in Examples 11 to 13.

The battery of Example 15 was decomposed in an inert atmosphere before and after the above evaluation test to take out the negative electrode and then was subjected to XPS analysis in the same condition as above. As result, it is confirmed that the peak derived from the $2p_{3/2}$ binding energy of Fe exists at about 707 eV either before or after the evaluation test. That is, it was found that Fe coating layer was formed in a metal state on the surface of the negative electrode. This is caused by mechanism that Fe(BF$_4$)$_2$ added to liquid non-aqueous electrolyte is ionized Fe$^{2+}$ ions and BF$_4^-$ ions, and then ionized Fe$^{2+}$ ions are precipitated Fe metal on the surface of the negative electrode at an initial charge.

Also, the batteries of Examples 16 and 17 were subjected to XPS analysis in the same condition as above, respectively. As result, in the case of Example 16, it is confirmed that the peak derived from the $2p_{3/2}$ binding energy of Ni exists at about 852 eV. In the case of Example 17, it is confirmed that the peak derived from the $2p_{3/2}$ binding energy of Co exists at about 777 eV. That is, the battery of Example 16 was found that Ni coating layer was formed in a metal state on the surface of the negative electrode in the same as the battery of Example 15. The battery of Example 17 was found that Co coating layer was formed in a metal state on the surface of the negative electrode.

According to the method of Examples 15 to 17, a thin metal coating layer can be uniformly formed on the negative electrode. Therefore, the method can be improved large-current characteristics compared with batteries of Examples 11 to 13, which are used a negative electrode active material previously formed a metal coating layer on its surface.

Embodiments of the present invention being thus described, it will be obvious that the present invention is not limited to the above embodiments and various modifications are therefore possible without departing from the spirit and scope of the present invention defined by the appended claims. Also, the present invention may be varied without departing from the spirit of the invention when it is embodied. Further, various inventions may be formed by appropriately combining a plurality of structural elements disclosed in the above embodiments.

What is claimed is:

1. An active material, comprising a lithium-titanium composite oxide particle, the lithium-titanium composite oxide having a spinel structure including $Li_{4+x}Ti_5O_{12}$ (0≤x≤3) or having a ramsdellite structure including $Li_{2+y}Ti_3O_7$ (0≤y≤3), and a coating layer formed on at least a part of the surface of the particle and including at least one metal selected from the group consisting of Mg, Ca, Sr, Ba, Zr, Nb, and Si, an oxide of at least one metal selected from the group or an alloy containing at least one metal selected from the group,
wherein the active material is adapted for a negative electrode.

2. The active material according to claim 1, wherein the coating layer has a thickness of 1 to 100 nm.

3. The active material according to claim 1, wherein the metal, the oxide of the metal, or the alloy is amorphous.

4. The active material according to claim 1, wherein a peak derived from a $2p_{3/2}$ binding energy of Mg in photoelectron spectroscopy exists in the range of 48 to 50 eV.

5. The active material according to claim 1, wherein the amount of in composition analysis using photoelectron spectroscopy is 0.1 to 1.0 atomic %.

6. The active material according to claim 1, wherein the coating layer includes at least one metal selected from the group consisting of Ca, Sr, Ba, Nb and Si, an oxide of at least one metal selected from the group or an alloy containing at least one metal selected from the group.

7. A non-aqueous electrolyte battery comprising:
an outer package;
a positive electrode housed in the outer package;
a negative electrode housed with a space from the positive electrode in the outer package and including an active material; and
a non-aqueous electrolyte filled in the outer package,
wherein the active material in the negative electrode comprises a lithium-titanium composite oxide particle, and a coating layer formed on at least a part of the surface of the particle, the lithium-titanium composite oxide having a spinel structure including $Li_{4+x}Ti_5O_{12}$ (0≤x≤3) or having a ramsdellite structure including $Li_{2+y}Ti_3O_7$ (0≤y≤3), and including at least one metal selected from the group consisting of Mg, Ca, Sr, Ba, Zr, Nb, and Si, an oxide of at least one metal selected from the group or an alloy containing at least one metal selected from the group.

8. The battery according to claim 7, wherein the coating layer has a thickness of 1 to 100 nm.

9. The battery according to claim 7, wherein the metal, the oxide of the metal, or the alloy is amorphous.

10. The battery according to claim 7, wherein the peak derived from a $2p_{3/2}$ binding energy of Mg of the negative electrode in photoelectron spectroscopy exists in the range of 48 to 50 eV.

11. The battery according to claim 7, wherein the amount of Mg in composition analysis of the negative electrode in photoelectron spectroscopy is 0.1 to 1.0 atomic %.

12. The battery according to claim 7, wherein the positive electrode contains a manganese-containing lithium-transition metal composite oxide.

13. The battery according to claim 12, wherein the manganese-containing lithium-transition metal composite oxide has a spinel type structure.

14. The battery according to claim 7, wherein the non-aqueous electrolyte contains a solvent obtained by mixing two or more solvents selected from the group consisting of propylene carbonate, ethylene carbonate and γ-butyrolactone.

15. A battery pack comprising a plurality of the non-aqueous electrolyte batteries according to claim 7 which are electrically connected each other in series, in parallel, or both in series and in parallel.

16. The battery pack according to claim 15, further comprising a protective circuit which detects the voltage of each of the batteries.

17. The battery according to claim 7, wherein the coating layer includes at least one metal selected from the group consisting of Ca, Sr, Ba, Nb and Si, an oxide of at least one metal selected from the group or an alloy containing at least one metal selected from the group.

* * * * *